June 24, 1930.   E. D. PHINNEY   1,765,735
RECORDING AND REPRODUCING SYSTEM
Filed Sept. 14, 1927   2 Sheets-Sheet 2
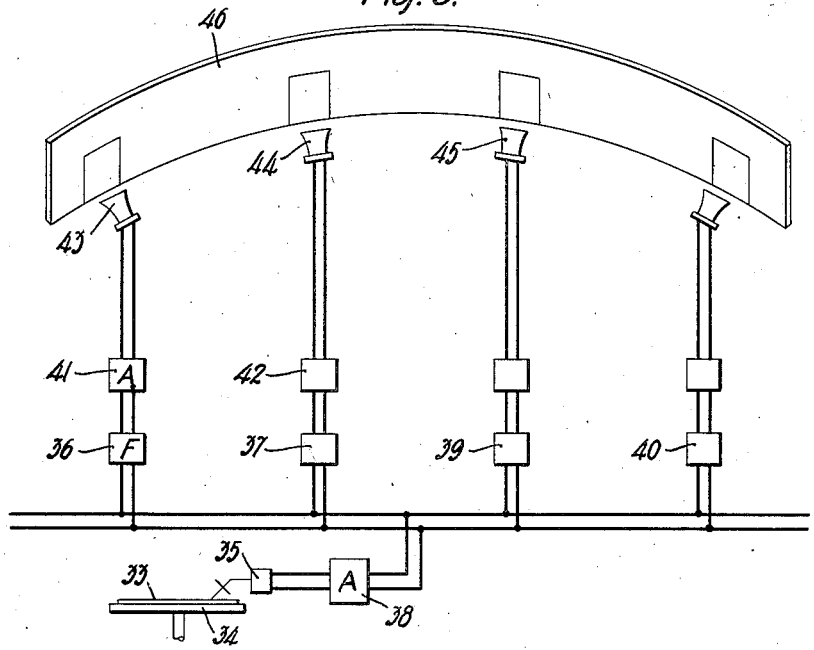
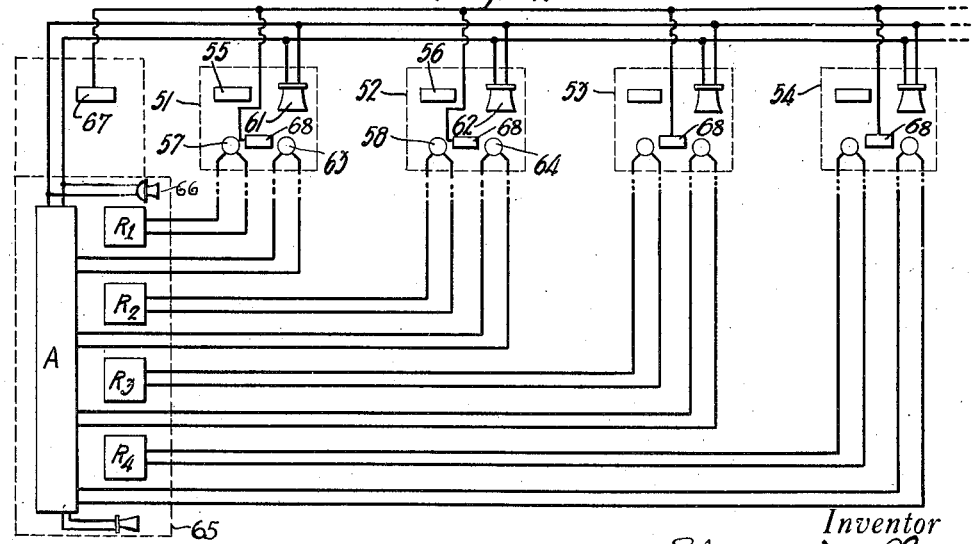
Inventor
Edward D. Phinney
by
his Attorney Patented June 24, 1930

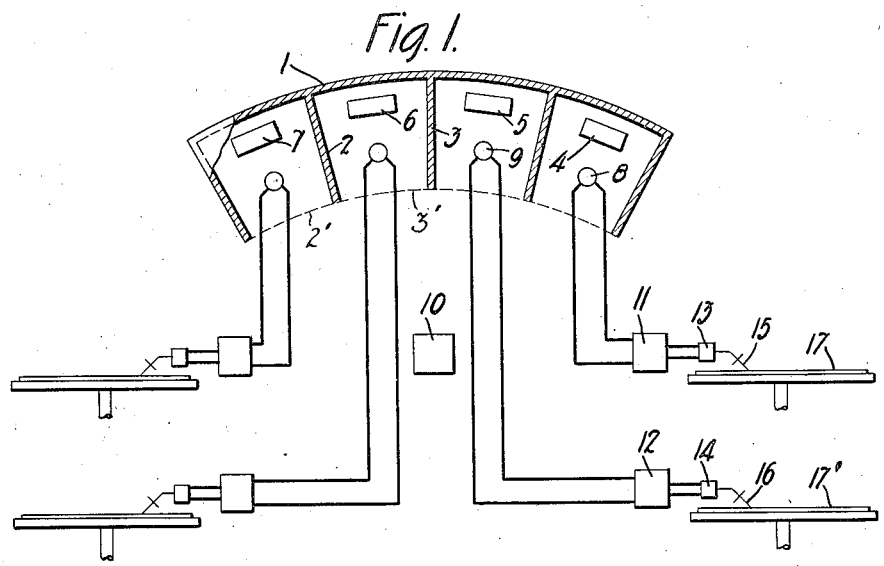
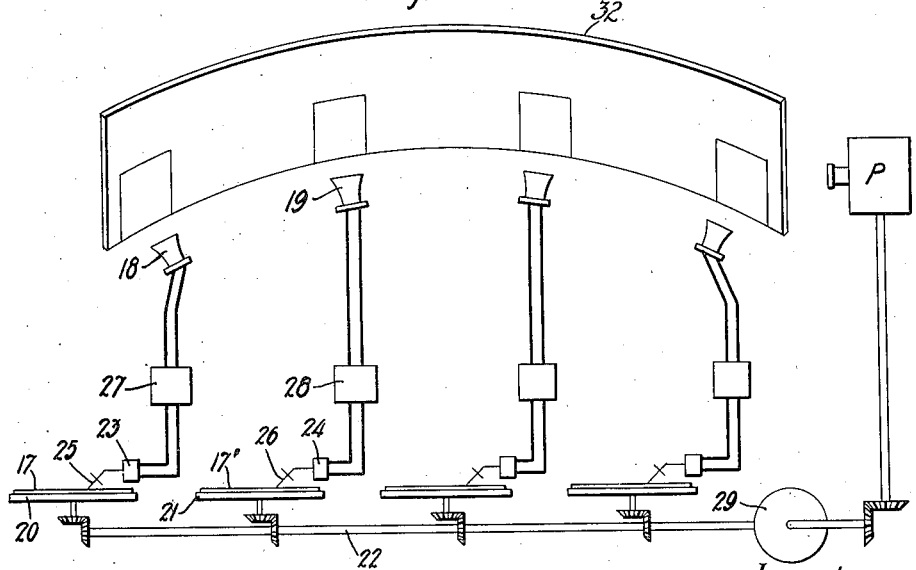

1,765,735

UNITED STATES PATENT OFFICE

EDWARD D. PHINNEY, OF MOUNT VERNON, NEW YORK, ASSIGNOR OF ONE-HALF TO PAUL KOLISCH, OF NEW YORK, N. Y.

RECORDING AND REPRODUCING SYSTEM

Application filed September 14, 1927. Serial No. 219,487.

This invention relates to systems for recording and reproducing sound programs, and more particularly to methods whereby the naturalness and pleasing qualities of the original performances are secured in the artificial reproduction.

The invention has for its principal object the provision of methods and apparatus for recording individually the section of a concerted sound program and enabling the qualities and characteristics of the individual sections to be recorded independently of one another.

It is an object of the invention also to employ an artificial sound record which is utilized to recreate the original program in such manner that the individual sections as separately recorded may be combined and reproduced in such relation that the total effect approaches, as nearly as possible, the effect produced by the original performance.

A feature of the invention pertains to the use of sound recording devices, each corresponding to a particular section of a concerted performance, whereby the complete characteristics of each section may be separately recorded and controlled, together with a plurality of corresponding reproducing devices whose individual operations are combined to give to an auditor an impression corresponding to that of an original performance.

Another feature of the invention relates to a method of simultaneously recording the effects of sounds from a plurality of spatially separated sources, which effects are required to be combined to produce a unitary impression on the ear of an auditor. According to this feature of the invention each individual sound source is provided with a corresponding pick-up and recording mechanism, the pick-up mechanism for each source being substantially unaffected by the other sources.

This feature of the invention, it will be appreciated, is highly desirable when recording a performance of an orchestra or a similar group of performers, inasmuch as each performer or group of performers produces a corresponding individualized sound record, the qualities of which may be controlled and reproduced in any desired manner.

Heretofore, it has been the practice in recording the performance of an orchestra or similar group of concerted artists, to provide a plurality of microphones distributed at various points throughout the recording room, and controlling the amplified current from the separate microphones to produce a single record which bears the characteristics of the performance as a whole. In such a system each microphone is affected by all the instruments. While systems of this type have certain advantages, it is desirable for other reasons that individual records be made for each group of instruments in an orchestra. Accordingly, it is a feature of this invention to provide a novel form of recording room in which instrument groups are located in mutually independent chambers which are viewable from a central point such, for example, as a conductor's stand.

Another feature of the invention relates to the use of a plurality of sound reproducing devices to be actuated by a single sound record, each device automatically selecting a particular portion of the frequency range of the sound program, whereby an auditor is enabled to instantly detect the proper location of the reproducing sound sources which faithfully follow the locations of the sources in the original performance.

Other features and advantages of the invention which have not been stated specifically will be revealed after a consideration of the following specification which describes a particular mode of utilizing the invention. It is understood, however, that the invention is not to be limited to the embodiment disclosed in the figures of the drawings, but is susceptible of other uses as will be apparent to those familiar with the art to which the invention relates. For this purpose the invention will be described and shown in connection with a sound recording and reproducing system using records of the mechanical media type such, for example, as wax records. Accordingly, Fig. 1 of the drawing shows a novel form of recording room illustrating the grouping and location of the separate sections of an orchestra, together with the corresponding individual microphones and recording devices.

Fig. 2 of the drawing shows a reproducing system to be operated in conjunction with the apparatus produced by the means disclosed in Fig. 1.

Fig. 3 is a modification of Fig. 2, whereby the same results are secured using a single wax record.

Fig. 4 is a modification of Fig. 1 showing the invention applied to long distance recording.

Referring to the drawing, numeral 1 indicates a recording room, the main wall of which is preferably in the form of a circular sector. The interior dividing walls 2, 3, etc., subdivide the main recording room into a plurality of separate smaller rooms or chambers wherein are located the various groups of instrumentalists. For example, percussion instruments 4 of the orchestra may occupy the right-hand chamber, the brass instruments 5 occupy the next chamber, the wood-wind instruments 6 occupy the next chamber, the stringed instruments 7 occupy the next chamber, etc. While it is desirable that this grouping of the instruments conform to the usual grouping for a musical performance, it is understood that the invention contemplates any arbitrary grouping which may be determined by the final results to be obtained. The walls 2, 3, etc., of the individual chambers are preferably constructed of sound insulating material in order that the vibrations from the several groups of instruments may not intermingle before their recording. It is also preferable to have the fronts of the chambers closed by glass partitions 2', 3'.

Located at a central point with respect to the individual chambers is a conductor's stand 10 from which a conductor may observe and control the individual performers. Located in each chamber corresponding to a group of instruments is a microphone 8, 9, etc. The output of each microphone is connected to a corresponding distortionless amplifying device 11, 12, etc., the output of which is in turn associated with the electromechanical recording device 13, 14, etc., which, by means of their styli 15, 16, produce corresponding cuttings in the wax record blanks 17. Any form of electromechanical recorder may be employed, as it forms no special feature of the present invention. The turntables upon which the record blanks are mounted are adapted to be rotated in synchronism, which synchronism may be effected by well-known electrical means or the respective turntables may be mechanically actuated from a common driving source. It is obvious by this method of recording that the entire characteristics of each group of instruments is incorporated in a separate record so that, if desired, the characteristics of one group of instruments as formed on the records may be controlled without affecting the characteristics of any other group.

For the purpose of reproducing the program recorded by the apparatus disclosed in Fig. 1, a plurality of loud speaking devices 18, 19 are provided, each loud speaker being adapted to be operated under control of a corresponding one of the sound records 17. Each loud speaker, therefore, corresponds to one of the groups of instruments 4, 5, etc. In order that the reproduction may faithfully follow the original performance, the loud speakers 18 and 19 are preferably arranged in the same order as the corresponding groups of instruments were arranged in the recording room. However, it is understood that any other grouping of the loud speakers may be made to meet any desired conditions.

This grouping in some cases may be determined by the acoustic properties of the auditorium. In other cases it may be desirable to give prominence to one particular group of instruments, in which case the corresponding loud speaker may occupy a more central position. The loud speakers have associated therewith respective electromechanical reproducers comprising the turntables 20, 21, etc., electrical pick-up devices 23, 24, etc., each of which carries a stylus 25, 26, etc., and a common driving shaft 22 which receives power from a suitable source 29. It is understood, however, that the turntables may be operated from individual sources which may be synchronized in any well-known manner. Connected between each pick-up device and its associated loud speaker is a suitable amplifying apparatus 27, 28, etc. Each of the turntables 20, 21 carries its respective record 17, 17'. For the purpose of translating the cuttings in the records into corresponding currents, the associated stylus follows the cuttings and correspondingly actuates the associated device 23 whereby electric currents are produced whose amplitudes vary in accordance with the amplitude of the sound cuttings. These varying currents are amplified by the amplifiers 27, 28 and actuate the loud speakers 18, 19, etc.

In some cases it may be desirable to accompany the acoustic reproduction from the loud speakers 18 and 19 by synchronized motion pictures in order to give a more realistic effect to the reproduction. The numeral 32 in Fig. 2 represents a screen upon which is projected by the motion picture projector P a picture of the orchestral performers. By any well-known means the operation of the picture projecting machine P may be synchronized with the turntables 20, 21, etc. When this scheme is employed it is obvious that the arrangement of the speakers 18 and 19 should correspond with the grouping of the instrumentalists whose pictures and movements are projected on the screen 32. For the purpose of rendering the synchronized performance more realistic, it is desirable that the loud speakers 18 and 19 be located in as close proximity as is possible to the screen 32. If further realism is desired, a panoramic screen may be employed as shown in Fig. 2 and the loud speakers 18 and 19 may be located adjacent to this screen in such a manner that each loud speaker corresponds to a particular section of the screen. By this arrangement the audience is enabled to coordinate both by the eye and the ear the exact location of the sound sources. For example, if the loud speaker 18 is reproducing the brass portion of the program, this reproduction will be projected from the particular portion of the screen where the pictures of the brass instrumentalists are projected. If, during the performance of the program, another group of instrumentalists are performing a solo, the woodwinds for example, the sound coming from the associated loud speaker will be projected from the proper portion of the screen and the auditor will not be misled as to the location of the soloists.

In Fig. 3 is shown a reproducing system for accomplishing the results obtained with the individual sound records disclosed in Fig. 2. In the system of Fig. 3, however, a single sound record 33 is employed. This record may be prepared in any well-known manner to incorporate a single continuous record of all the sections of the orchestra. For the purpose of translating the sound record into electrical currents, suitable electromechanical reproducing equipment is employed comprising turntable 34 and the pick-up device 35. The sound modulated currents generated by device 35 are amplified by suitable means 38, preferably of the distortionless type. These amplified currents are fed in parallel to the band-pass filters 36, 37, etc., which may be of the general type disclosed in the patents to G. A. Campbell, Nos. 1,227,113 and 1,227,114, issued May 22, 1917. Each of the filters 36, 37 is preferably designed to pass a band of frequencies corresponding to the average range of frequencies of the sounds generated by the various sections of the orchestra. For example, it is obvious that the percussion instruments generate sound frequencies of a substantially limited range. Similarly, the woodwinds generate sound frequencies of a substantially different range, while other sections of the orchestra are concerned with sound frequencies of still other ranges. Thus the filter 36 will correspond to the percussion instruments, filter 37 to the low-pitched stringed instruments, filter 39 to the woodwind instruments, and filter 40 to the brass instruments. The currents passed by these filters will therefore bear a definite relation to the character of the sounds generated by the corresponding sections of the orchestra. These currents are then fed to respective amplifiers 41, 42, etc., the output circuits of which are connected to the associated loud speakers 43, 44, etc. 46 represents a screen upon which may be projected the pictures of the orchestral performers, these pictures being synchronized in a well-known manner with the sound from the loud speakers. As mentioned in connection with Fig. 2, screen 45 may be a relatively long screen suitable for projecting a panoramic view of the orchestra and the loud speakers 43, 44 may be placed to correspond with the pictures of the performers as projected on the screen for the purpose of giving the maximum realism to the synchronized program.

It will be noted that in Fig. 3 individual amplifying and filtering equipment is required for each loud speaker that is employed for the purpose of separating the currents from amplifier 38 into their respective frequency ranges. Filters 36, 37, etc. may be eliminated and a similar result accomplished by utilizing loud speakers which have reproducing range characteristics corresponding to the ranges of the currents passed by the said filters. For example, loud speaker 43 may be so designed as to reproduce efficiently only the very low frequency sounds while other ranges of sounds are reproduced most efficiently by the remaining loud speakers 44, etc. As is well known in the art, these loud speakers may be designed to reproduce sounds which are characteristic of particular instruments, for example, loud speaker 43 may take the form of a large cone reproducer having a substantial low cut-off frequency. Loud speaker 44 may be in the form of a small metallic horn for reproducing sounds which are characteristic of the brass instruments, while loud speaker 46 may be of the wood horn type which, as is well known, reproduces the characteristics of the woodwinds most faithfully, and similarly for the remaining loud speakers.

By means of the arrangements disclosed in the several figures of the drawing, the utmost realism may be attained in concerted programs, particularly of the orchestral type.

The invention has as one of its possible applications so-called "long distance recording." In Fig. 1 the instrumentalists are shown as grouped in respectively insulated compartments within the same recording room, but it is obvious that these instrumentalists may be located at widely separated points, for example, when it is desired to record the simultaneous performances of a number of artists in different cities. In such an application of the invention it is necessary that the performances of the individual artists be properly synchronized. One means of accomplishing this result is disclosed in Fig. 4, in which the rectangles 51, 52, 53, 54 represent recording studios in different cities. One group of artists, for example, those playing the brass instruments, are situated in room 51. Another group, for example, the woodwinds 56, are located in room 52, and so on for the remaining groups of instrumentalists. The performance of each group of instrumentalists is picked up by the respective micophones 57, 58, etc., the amplified currents from these microphones operating the reproducers R¹, R², etc., to produce records similar to the records disclosed in Fig. 1. If desired, these microphones may be connected by means of suitable transmission lines to a central location with respect to the various recording rooms.

For the purpose of coordinating the performances of the separate groups, it is necessary that each group be apprised during its performance of that of the other groups. For this purpose each studio is provided with a separate microphone 63, 64, etc., the currents from these microphones being connected in parallel to a central amplifier A. The amplified currents from device A are then fed in parallel by means of suitable transmission lines to the respective studios where they function to operate monitoring loud speakers 61, 62, etc. These monitoring loud speakers are suitably situated to enable each group of performers to regulate its performance in accordance with the other groups, and are preferably so situated as to have substantially no effect upon the recording microphones 57, 58, etc.

For the purpose of controlling the starting in synchronism of the various groups of performers, a conductor at the central station 65 is provided with a transmitter 66 by means of which he can communicate with each of the separate recording rooms 51, 52, etc. Thus a characteristic signal may be transmitted to each room as a starting signal and the conductor can, during the actual performance, communicate instructions through the monitoring loud speakers 61. Instead of employing the loud speakers for this purpose, each room may be provided with a number of different colored lamps, each of which when illuminated, is adapted to convey certain instructions to the performers. These lamps, of course, will be controlled from the central station 65 by the conductor. The invention also contemplates the use of television screens for the purpose of producing in each room 51 an actual picture of the conductor at the central station, so that the various groups of performers may follow his movements in the same manner as if he were present in person. In Fig. 4 the television or light transmitter is indicated by 67 and the receiving screens or lamps by 68.

What I claim is:

1. The method of receiving and combining the simultaneous concerted performance of groups of artists located at widely separated points, which comprises causing the performance of each group to be received at a central station, electrically transmitting during the receiving process from said central station to each group of artists visual and audible signals for the purpose of coordinating the artists' performance.

2. Means for receiving and combining the simultaneous concerted performance of groups of artists located at widely separated points, comprising a recording room for each group of artists, an electrical pick-up device in each room, sound recording mechanism at a central station operated under control of said pick-up devices, means for transmitting, during the recording process, from the central station to each room, a contemporaneous reproduction of the concerted performance of all the groups, and means for transmitting from said central station to each room during the recording process visual signals for the purpose of coordinating the performances of the several groups.

3. The method of reproducing the concerted performance of a group of artists which comprises using individual records of each artist's performance, each record being unaffected by the simultaneous peformance of the other artist's to control corresponding reproducing devices each having different characteristic acoustic qualities and locating said reproducing devices in such position as to give in reproduction the distributed musical effect of the original concerted program.

4. In a system for reproducing an original concerted sound program, a plurality of individual and mutually independent records of contemporaneous portions of the original program, a plurality of reproducers each corresponding to one of said records and having different acoustic characteristics, said reproducers being so located as to give in their concerted operation the effect of the original concerted program.

5. In a system for coordinating the performances of artists located at widely separated points, a central station, means for transmitting from each of the said points to said central station reproductions of each artist's performance, and means at the central station for transmitting to each of said points a contemporaneous concerted reproduction of all the artists' performances.

6. In a system for coordinating the performances of artists located at widely separated points, a central station, transmission channels extending between the central station to each of said points, means for contemporaneously transmitting from each point to said station, currents corresponding to each artist's performance, means at the central station for combining said currents and transmitting to said points portions of the combined current for the purpose of apprising each artist of the contemporaneous performances of the other artists.

7. Means for receiving and combining concerted performances of artists located at widely separated points comprising a central station, outlying stations, a transmission channel extending between each outlying station and the central station, means at each outlying station for sending over the associated channel currents corresponding to the artist's performance thereat, means at the central station for combining and amplifying the currents transmitted from the outlying stations, and means for retransmitting from the central station to each of the outlying stations, a portion of the combined currents for the purpose of apprising each artist of the contemporaneous performances of the artist in the other outlying station.

8. In a system for coordinating the performances of artists located at widely separated points, a central station, means for transmitting from each of the said points to said central station reproductions of each artist's performance, means at the central station for transmitting to each of said points a contemporaneous concerted reproduction of all the artists' performances, and means at the central station for recording said concerted performance.

9. The method of coordinating the performance of artists located at widely separated points which comprises indicating at a central station the individual performance occurring at the separated points, and at the separated points the concerted performance of the artists.

10. In a system for controlling the performance of artists located at a point distant from a central station, means for transmitting from said point to said central station reproductions of the artists' performance, and television means at said point and said central station for transmitting to said point visual directing signals.

11. In a system for controlling the performance of artists located at a point distant from a central station, means for transmitting from said point to said central station reproductions of the artists' performance and television means for transmitting from said central station, to said point, a moving picture of a conductor so that the artists may follow his movements in the same manner as if he were present in person.

In testimony whereof, I have signed my name to this specification this 12th day of September, 1927.

EDWARD D. PHINNEY.